3,101,207
PROCESS FOR THE PRODUCTION OF GAS-TIGHT TUBE CONNECTIONS
Werther Pavel, Hilden, Rhineland, and Rudolf Köhler, Dusseldorf, Germany, assignors to Henkel & Cie. G.m.b.H., Dusseldorf-Holthausen, Germany, a corporation of Germany
Filed July 23, 1959, Ser. No. 828,963
Claims priority, application Germany July 26, 1958
17 Claims. (Cl. 285—291)

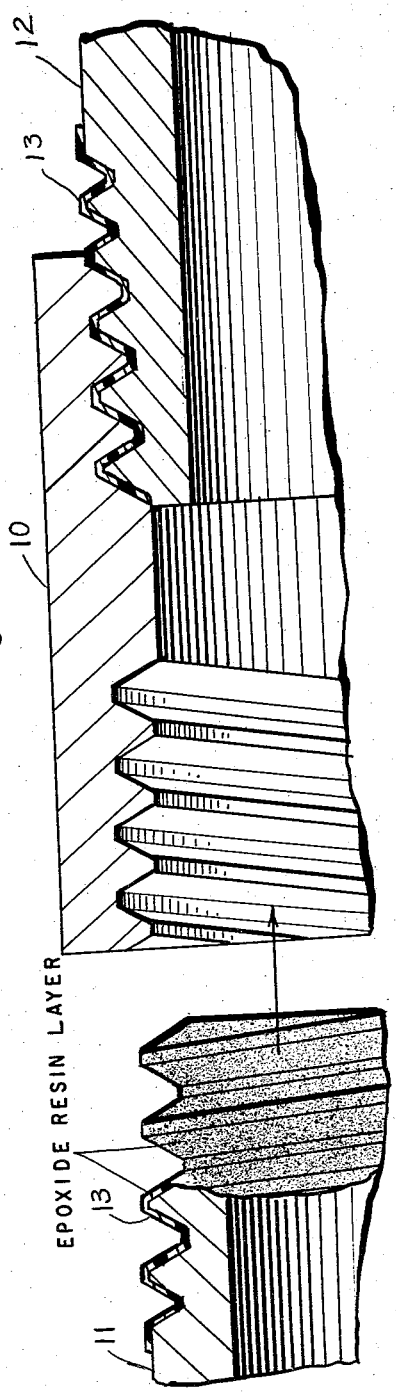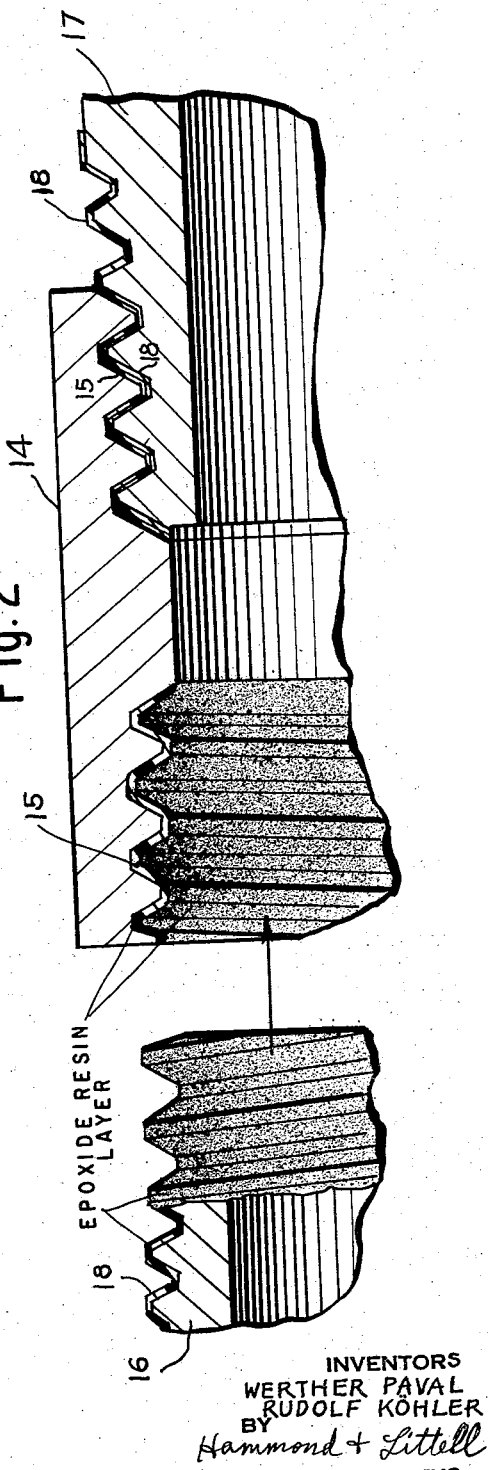

This invention relates to a process for the production of gas-tight threaded connections of tubes.

Normal threaded tube connections are generally not gas-tight. Heretofore it has been attempted to produce gas-tight threaded connections of tubes by applying a soft layer between the two parts of the threaded ends, for example a layer consisting of a fiber substance which was admixed with a fat-like mass. This intermediate layer had to be inserted between the threaded ends upon making the connection. This method was awkward and had the disadvantage that dirt or sand contaminated the threads if the operation was carried out in the open air.

It is an object of this invention to produce threaded tube connections which are gas-tight.

It is a further object of this invention to produce threaded tube connections which are easily joined and separated at any time.

These and other objects of our invention will become apparent as the description thereof proceeds.

We have now found that these objects may be achieved by the use of our invention. In accordance with the process of our invention it has now become possible to prepare the threaded portions immediately after their production in such a way that gas-tight connections can be achieved at any desired subsequent time by merely screwing the tubes together and without any additional operation. The preliminary treatment of the threads to be joined in accordance with the present invention is simple and does not involve high costs.

The method according to the present invention consists of applying a thin layer of a hardenable synthetic resin which hardens without giving off volatile components to one or both parts of the threaded connection and hardening the resin. The threads treated in this manner may then be screwed together at any desired subsequent time, even after prolonged storage. The screw connection thus established is then gas-tight and may, in addition, be disconnected without difficulties. The hardened synthetic resin layer is not sticky, so that dust particles do not adhere thereto. If desired, the threads may also be rinsed with water.

The invention may be further understood by reference to the drawings in which

FIG. 1 is a partial cross-sectional view of threaded and unthreaded coupling and tubes having a resinous layer applied to threads of the tubes;

FIG. 2 is a partial cross-sectional view of threaded and unthreaded coupling and tubes having a resinous layer aplied to the threads of the tubes and coupling member.

Referring to FIG. 1, a tubular coupling member 10, internally threaded at both ends, is shown. Tubes 11 and 12 are externally threaded for connection by coupling 10. Tubes 11 and 12 are provided with a layer of hardened synthetic resin 13. Tube 11 is shown in an unjoined position and tube 12, with the resinous layer 13 previously applied in the joined position to form a gas-tight connection. Tubes may be disconnected and reconnected without any change in the effectiveness of the gas-tight connection. The resinous layer can be applied to the threads of coupling 10 instead of the threads of tubes 11 and 12.

Furthermore, as shown in FIG. 2, the resin layer can be applied to the threads of both coupling and tubes. Coupling 14 has a layer of resin 15, and tubes 16 and 17 have a layer of resin 18. Tube 16 is shown in a disconnected position, and tube 17 is shown in a connected position, forming a gas-tight connection. The previously hardened layers of resin 15 and 18 on the coupling 14 and tube 17 respectively, remain distinct and separate coatings. Thus, the connection between coupling 14 and tube 17 may be disconnected and reconnected without affecting the gas-tight relationship of the connection.

For the performance of the process according to the invention those synthetic resins are used which are hardenable without giving off volatile components and which possess a sufficient adhering quality to metals. Most advantageously, a synthetic resin is used which, after hardening, exhibits a hardness between 50 and 1000 kg./cm.$^2$ in accordance with Standardization Bulletin D.I.N. 57302 using a ball with a diameter of 5 mm. The resin to be used should not be brittle, but elastic after hardening. For this reason, it is advantageous to add plasticizing substances to the synthetic resin or to use an insufficient amount of the particular hardening agent to produce complete hardening. Obviously, these two measures may be applied simultaneously.

Synthetic resins which can be hardened without giving off volatile components and which are therefore suitable for the performance of the process according to the invention are, for example, the so-called epoxide resins. Since this group of resins adheres very well to the surface of metals as well as plastics, they are particularly well-suited for the performance of the process in accordance with the invention if such resins are produced, for example, by known methods by reacting polyvalent phenols with epichlorohydrin. However, the epoxide compounds produced in accordance with the process described in published German application 1,030,824 by reacting epichlorohydrin with salts of poly-basic aromatic carboxylic acids may also be used. Other methods for the production of epoxide resins, meaning quite generally hardenable substances which contain more than one epoxide group in the molecule, are suitable to obtain the synthetic resins required for the process according to the present invention.

The hardening of the epoxide resins, which is effected after applying the resins to the threads, may be accomplished with the aid of any desired hardener. The hardeners are advantageously added to the resin prior to its application to the threads. Examples of hardeners which suitable for this purpose are acid substances, especially anhydrides of poly-basic carboxylic acids, or basic compounds, such as aliphatic di- or polyamines. Other known hardeners, such as certain acid amides, are also suitable. The hardening may be effected with or without heating, depending upon the hardener employed. However, those hardeners are preferred which contain amino groups in the molecule because the hardening may be effected with the aid of these substances even at room temperature.

In order to impart the desired degree of elasticity to the epoxide resin after hardening, it is advantageous to add plasticizing substances to the resin. For this purpose any desired known plasticizing agent may be used, such as esters of poly-basic carboxylic acids, polyvalent alcohols, rubber-degradation products, reaction products of chlorohydrocarbons with alkali metal sulfides and many more.

Other synthetic resins which may be used for the performance of the process according to the invention are those which may be hardened with the aid of a polymerization process due to the presence of double bonds. Such materials include, for example, unsaturated polyesters and other high-molecular weight unsaturated compounds. The hardening of these compounds is effected in accordance with known methods by adding suitable polymerization catalysts, for example with the aid of organic peroxides. Since it is necessary for the performance of the process according to the invention that the synthetic resins possess a certain viscosity prior to hardening, it is advantageous to employ those unsaturated compounds which have an average molecular weight greater than 1000. However, it is also possible to use low-molecular, low-viscosity liquid products and to thicken these with suitable fillers.

In addition, those synthetic resins are suitable for the performance of the novel process which are produced by reaction of di-or poly- isocyanates with those compounds which contain active hydrogen atoms, that is with alcohols or amines. Such resins are known under the names of polyurethanes or polyureas.

The process according to the invention is not limited to the above-mentioned synthetic resins. Instead, any synthetic resin which is hardenable without giving off volatile components has a sufficient degree of adherence to metals, and possess a sufficient hardness and elasticity, may be employed.

In order to improve the joining and disconnecting properties of the threads, it is advantageous to add solid fillers to the synthetic resin, the filler having a certain lubricating effect. Such fillers are, for example, graphite, powdered lead, zinc dust, copper flakes, molybdenum sulfide, and the like. These filler materials should not contain coarse particles. The amount of filler material added is, in general, up to 50% and in exceptional cases up to 80% by weight of the mixture.

The application of the synthetic resin to the threads may be accomplished in any desired manner, for example by dipping, painting with a brush, spraying or with a putty knife. In the event that the resin has too great a viscosity for this purpose, it may be diluted with a solvent. Suitable solvents are primarily readily volatile organic liquids in which the particular synthetic resin is soluble, for example ketones, such as acetone, as well as chlorohydrocarbons and other solvents. Prior to joining the threaded connection, the solvent must be removed again.

The thickness of the synthetic resin layer to be applied to the threads may vary within wide limits. The thickness depends, among other factors, upon the diameter of the tubes to be screwed together and upon the type of thread. In general, a thin layer is applied which need not exceed a thickness of 1 mm., even in the case of large tubes.

The process according to the invention may be used for joining tubes of all types, but especially of metal tubes made of steel, light metals or non-ferrous metals. In addition, tubes made of plastic or compound tubes may be joined in gas-tight fashion with the aid of this novel process.

Similarly, the process according to the invention is equally suitable for effecting gas-tight tube connections on thin tubes, such as gas lines in laboratories or in the home, but it is also suitable to connect gas mains with a larger diameter, such as those used in city gas mains or cross-country gas lines. The novel process is used with particular advantage for establishing gas-tight connections on casing pipes in the oil industry because the tube connections according to the present invention remain gas-tight even after applying a strong mechanical stress.

The following example is given for the purpose of illustration and to enable persons skilled in the art to better understand and practice the invention and are not intended to be limitative.

EXAMPLE I 200 gm. of the reaction product of sodium phthalate and epichlorohydrin, produced in accordance with published German application 1,030,824, were admixed with 100 gm. adipic acid triglycol ester. This mixture was admixed with 20 gm. diethylene-triamine, 175 gm. graphite and 25 gm. molybdenum sulfide and the mixture was dissolved in 400 gm. methylene chloride. The solution was sprayed onto a thread of a steel pipe having a diameter of 7 inches and a wall thickness of 9.2 mm., so that coating of 0.2 mm. thickness remained on the pitch of the threads. Subsequently, the pipe was stored at room temperature for 24 hours whereby the solvent evaporated and then hardening of the epoxide resin was effected. The threads thus treated could readily be screwed together and again unscrewed. The screw connection was gas-tight.

A sample of the synthetic resin used in the preceding example was allowed to harden at room temperature for 24 hours without adding a solvent. Thereafter, the hardness was determined with the aid of a ball having a diameter of 5 mm. in accordance with standard Bulletin DIN 57302. A hardness value of 300 kg./cm.$^2$ was obtained.

If it is desired, the hardened resins may be also characterized by the elastic modulus. The elastic modulus of the hardened resins which are used in this invention is about 500 to 50,000 kg./cm.$^2$. The hardened synthetic resin used in the preceding example has an elastic modulus of 8,000 kg./cm.$^2$.

While we have set forth specific embodiments and preferred modes of practice of our invention it will be understood that the invention is not limited thereto and that various changes and modifications may be made without departing from the spirit of the invention and the scope of the appended claims.

We claim:

1. A method for making gas-tight and readily separable threaded tube connections which comprises applying to at least one of the threaded members prior to joining, an adherent layer of a synthetic resin in fluent form which is hardenable to a hardness of 50 to 1000 kg./cm.$^2$ without giving off volatile components and hardening said resin prior to joining, to a hardness sufficient to permit ready joining and separating of said threaded connections, while maintaining sufficient elasticity of said resin to make said threaded connections gas-tight.

2. A method for making gas-tight and readily separable threaded tube connections which comprises applying to at least one of the threaded members prior to joining, an adherent layer of a synthetic resin in fluent form which is hardenable to a hardness of 50 to 1000 kg./cm.$^2$ without giving off volatile components, said resin containing plasticizing additives, and hardening said resin prior to joining, to a hardness sufficient to permit ready joining and separating of said threaded connections, while maintaining sufficient elasticity of said resin to make said threaded connections gas-tight.

3. A method for making gas-tight and readily separable threaded tube connections which comprises applying to at least one of the threaded members prior to joining, as adherent layer of a synthetic resin in fluent form which is hardenable to a hardness of 50 to 1000 kg./cm.$^2$ without giving off volatile components in admixture with an amount of a hardening agent which is insufficient for complete hardening of the resin, and hardening said resin prior to joining, to a hardness sufficient to permit ready joining and separating of said threaded connections, while maintaining sufficient elasticity of said resin to make said threaded connections gas-tight.

4. A method for making gas-tight and readily separable threaded tube connections which comprises applying to at least one of the threaded members prior to joining, an adherent layer of an epoxide resin in fluent form and hardening said resin with a hardening agent prior to joining, to a hardness sufficient to permit ready joining and separating of said threaded connections, while maintaining sufficient elasticity of said resin to make said threaded connections gas-tight.

5. The process of claim 4 wherein a compound containing amino groups is used as the hardener.

6. A method for making gas-tight and readily separable threaded tube connections which comprises applying to at least one of the threaded members prior to joining, an adherent layer of a synthetic resin in fluent form which is hardenable without giving off volatile components, wherein said synthetic resin is an unsaturated compound which may be hardened by polymerization to a hardness of 50 to 1000 kg./cm.$^2$, and hardening said resin prior to joining, to a hardness sufficient to permit ready joining and separating of said threaded connections, while maintaining sufficient elasticity of said resin to make said threaded connections gas-tight.

7. The process of claim 6 wherein said synthetic resin is an unsaturated polyester resin.

8. A method for making gas-tight and readily separable threaded tube connections which comprises applying to at least one of the threaded members prior to joining, an adherent layer of a synthetic resin in fluent form which is hardenable without giving off volatile components, wherein said resin is a product of a reaction between a member selected from the group consisting of di- and polyisocyanates and a compound containing active hydrogen atoms, and hardening said resin prior to joining, to a hardness sufficient to permit ready joining and separating of said threaded connections, while maintaining sufficient elasticity of said resin to make said threaded connections gas-tight.

9. The process of claim 8 wherein said synthetic resin is selected from the group consisting of polyurethane and polyurea resins.

10. A method for making gas-tight and readily separable threaded tube connections which comprises applying to at least one of the threaded members prior to joining, an adherent layer of a synthetic resin in fluent form which is hardenable to a hardness of 50 to 1000 kg./cm.$^2$ without giving off volatile components, said resin having added solid filler materials having a lubricating effect, and hardening said resin prior to joining, to a hardness sufficient to permit ready joining and separating of said threaded connections, while maintaining sufficient elasticity of said resin to make said threaded connections gas-tight.

11. A method for making gas-tight and readily separable threaded tube connections which comprises applying to at least one of the threaded members prior to joining, an adherent layer of a synthetic resin diluted with a solvent, said resin being hardenable to a hardness of 50 to 1000 kg./cm.$^2$ without giving off volatile components, evaporating said solvent and hardening said resin prior to joining, to a hardness sufficient to permit ready joining and separating of said threaded connections, while maintaining sufficient elasticity of said resin to make said threaded connections gas-tight.

12. A gas-tight and readily separable threaded tube connection comprising threaded tubes having on the threads of at least one of said tubes an adherent hardened layer of a fluent form synthetic resin which is hardenable to a hardness of 50 to 1000 kg./cm.$^2$ without giving off volatile components, said hardened layer having been hardened after application to said threads and prior to joining, to a hardness sufficient to permit ready joining and separating of said threaded connections, while maintaining sufficient elasticity of said resin to make said threaded connections gas-tight.

13. A gas-tight and readily separable threaded tube connection comprising threaded tubes having on the threads of at least one of said tubes an adherent hardened layer of an epoxide resin, said hardened layer having been hardened after application to said threads and prior to joining, to a hardness sufficient to permit ready joining and separating of said threaded connections, while maintaining sufficient elasticity of said resin to make said threaded connections gas-tight.

14. A gas-tight and readily separable threaded tube connection comprising threaded tubes having on the threads of at least one of said tubes an adherent hardened layer of a fluent form synthetic polymerized resin which hardens to a hardness of 50 to 1000 kg./cm.$^2$ without giving off volatile components, said hardened layer having been hardened after application to said threads and prior to joining, to a hardness sufficient to permit ready joining and separating of said threaded connections, while maintaining sufficient elasticity of said resin to make said threaded connections gas-tight.

15. The connection of claim 14 wherein the synthetic resin is an unsaturated polyester resin.

16. A gas-tight and readily separable threaded tube connection comprising threaded tubes having on the threads of at least one of said tubes an adherent hardened layer of a fluent form synthetic resin hardenable without giving off volatile components, said resin being the product of a reaction between a member selected from the group consisting of di- and polyisocyanates with a compound containing active hydrogen atoms, said hardened layer having been hardened after application to said threads and prior to joining, to a hardness sufficient to permit ready joining and separating of said threaded connections, while maintaining sufficient elasticity of said resin to make said threaded connections gas-tight.

17. The connection of claim 16 wherein the resin is selected from the group consisting of polyurethane and polyurea resins.

References Cited in the file of this patent

UNITED STATES PATENTS

| | | |
|---|---|---|
| 1,141,151 | Speller | June 1, 1915 |
| 2,335,958 | Parker | Dec. 7, 1943 |
| 2,399,526 | Warren | Apr. 30, 1946 |
| 2,430,479 | Ruthrock | Nov. 11, 1947 |
| 2,646,822 | Ferguson | July 28, 1953 |
| 2,729,618 | Muller | Jan. 3, 1956 |
| 2,785,911 | Kaufman | Mar. 19, 1957 |
| 2,901,099 | Krieble | Aug. 25, 1959 |
| 2,928,446 | James | Mar. 15, 1960 |
| 2,939,805 | Johnson | June 7, 1960 |
| 3,002,770 | Chesnut et al. | Oct. 3, 1961 |
| 3,059,697 | Pitts | Oct. 23, 1962 |

OTHER REFERENCES

Skeist, Reinhold Plastics Applications Series, Epoxy Resins; Reinhold Pub. Corp., 1958 pages 60–61.